(12) United States Patent
Habetha et al.

(10) Patent No.: US 8,014,408 B2
(45) Date of Patent: Sep. 6, 2011

(54) NETWORK WITH SEVERAL SUBNETWORKS

(75) Inventors: Joerg Habetha, Aachen (DE); Stefan Mangold, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1638 days.

(21) Appl. No.: 10/489,121

(22) PCT Filed: Sep. 13, 2002

(86) PCT No.: PCT/IB02/03784
§ 371 (c)(1),
(2), (4) Date: Mar. 10, 2004

(87) PCT Pub. No.: WO03/026224
PCT Pub. Date: Mar. 27, 2003

(65) Prior Publication Data
US 2004/0240457 A1    Dec. 2, 2004

(30) Foreign Application Priority Data
Sep. 15, 2001 (DE) .................. 101 45 596

(51) Int. Cl.
*H04L 12/28* (2006.01)
(52) U.S. Cl. ........ 370/401; 370/252; 370/256; 370/349; 370/469; 370/85.14; 709/223; 709/225; 709/226; 709/229; 709/201
(58) Field of Classification Search .......... 370/252, 370/254, 394, 464–469, 94.1, 85.13, 85.14, 370/256, 352, 349; 709/223, 225, 226, 229, 709/210, 201
See application file for complete search history.

(56) References Cited

U.S. PATENT DOCUMENTS

| | | | | |
|---|---|---|---|---|
| 33,426 A | * | 10/1861 | Sugimoto et al. ............ | 19/163 |
| 4,706,081 A | * | 11/1987 | Hart et al. .................. | 370/254 |
| RE33,426 E | * | 11/1990 | Sugimoto et al. ........... | 370/402 |
| 5,088,090 A | * | 2/1992 | Yacoby ....................... | 370/402 |
| 5,214,646 A | * | 5/1993 | Yacoby ....................... | 370/402 |
| 5,295,154 A | * | 3/1994 | Meier et al. ................. | 370/351 |
| 5,323,394 A | * | 6/1994 | Perlman ...................... | 370/238 |
| 5,504,747 A | * | 4/1996 | Sweazey ...................... | 370/403 |

(Continued)

FOREIGN PATENT DOCUMENTS

EP    0996257 A    4/2000

(Continued)

OTHER PUBLICATIONS

Li Jiandong et al: "User-dependent perfect-scheduling multiple access (UPMA) or wireless ad hoe internet access" Proceedings of 16th International Conference on Communication Technology (ICCT'OO), vol. 2, Aug. 21-25, 2000, pp. 1714-1717, XP010526693 Beijing, China.*

(Continued)

*Primary Examiner* — Ayaz R Sheikh
*Assistant Examiner* — Andrew C Lee

(57) ABSTRACT

The invention relates to a network with several subnetworks, which are organized either decentrally or centrally and can be connected in each case each by bridge terminals, a proxy terminal for a bridge terminal being set up in at least one of the subnetworks, which proxy terminal during an absence (dictated by frequency, time, code, or other factors) of the bridge terminal accepts all data directed to the bridge terminal or to be forwarded thereby, temporarily stores the data, and forwards said data to the bridge terminal when this is present again.

7 Claims, 2 Drawing Sheets

U.S. PATENT DOCUMENTS

Figure 1:
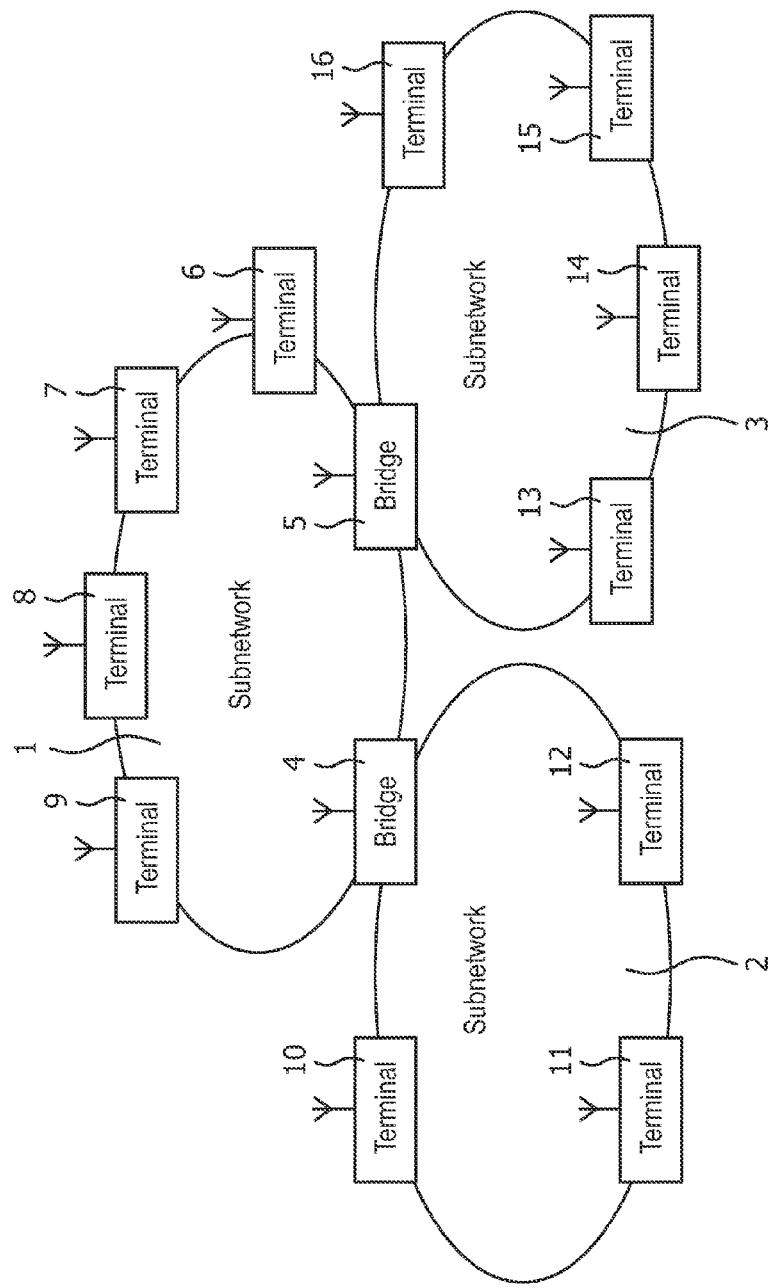

| | | | |
|---|---|---|---|
| 5,734,824 A * | 3/1998 | Choi | 709/224 |
| 5,790,431 A * | 8/1998 | Ahrens et al. | 718/104 |
| 5,828,847 A * | 10/1998 | Gehr et al. | 709/239 |
| 5,832,283 A * | 11/1998 | Chou et al. | 713/300 |
| 5,915,119 A * | 6/1999 | Cone | 713/310 |
| 5,987,011 A * | 11/1999 | Toh | 370/331 |
| 6,034,951 A * | 3/2000 | Du | 370/328 |
| 6,084,867 A * | 7/2000 | Meier | 370/338 |
| 6,115,393 A * | 9/2000 | Engel et al. | 370/469 |
| 6,272,120 B1 * | 8/2001 | Alexander | 370/338 |
| 6,292,508 B1 * | 9/2001 | Hong et al. | 375/134 |
| 6,445,691 B2 * | 9/2002 | Sato | 370/338 |
| 6,457,053 B1 * | 9/2002 | Satagopan et al. | 709/226 |
| 6,501,760 B1 * | 12/2002 | Ohba et al. | 370/395.42 |
| 6,522,650 B1 * | 2/2003 | Yonge et al. | 370/390 |
| 6,697,649 B1 * | 2/2004 | Bennett et al. | 455/574 |
| 6,701,361 B1 * | 3/2004 | Meier | 709/224 |
| 6,724,763 B1 * | 4/2004 | Hiraiwa | 370/401 |
| 6,842,460 B1 * | 1/2005 | Olkkonen et al. | 370/465 |
| 6,865,609 B1 * | 3/2005 | Gubbi et al. | 709/230 |
| 6,928,061 B1 * | 8/2005 | Garcia-Luna-Aceves et al. | 370/329 |
| 6,987,770 B1 * | 1/2006 | Yonge, III | 370/401 |
| 6,990,090 B2 * | 1/2006 | Meier | 370/338 |
| 7,006,472 B1 * | 2/2006 | Immonen et al. | 370/332 |
| 7,020,697 B1 * | 3/2006 | Goodman et al. | 709/223 |
| 7,184,413 B2 * | 2/2007 | Beyer et al. | 370/254 |
| 7,305,581 B2 * | 12/2007 | Geng et al. | 714/11 |
| 7,522,563 B2 * | 4/2009 | Rhee | 370/338 |
| 7,558,557 B1 * | 7/2009 | Gollnick et al. | 455/343.4 |
| 2001/0029585 A1 * | 10/2001 | Simon et al. | 713/200 |
| 2001/0033554 A1 * | 10/2001 | Ayyagari et al. | 370/328 |
| 2002/0025810 A1 * | 2/2002 | Takayama et al. | 455/432 |
| 2002/0026379 A1 * | 2/2002 | Chiarabini et al. | 705/26 |
| 2002/0048268 A1 * | 4/2002 | Menon et al. | 370/349 |
| 2002/0061009 A1 * | 5/2002 | Sorensen | 370/351 |
| 2002/0069278 A1 * | 6/2002 | Forslow | 709/225 |
| 2002/0126641 A1 * | 9/2002 | Bender | 370/337 |
| 2002/0194498 A1 * | 12/2002 | Blight et al. | 713/201 |
| 2005/0232213 A1 * | 10/2005 | Meier | 370/338 |
| 2006/0059253 A1 * | 3/2006 | Goodman et al. | 709/223 |
| 2006/0123079 A1 * | 6/2006 | Sturniolo et al. | 709/203 |
| 2007/0121529 A1 * | 5/2007 | Meier | 370/256 |

FOREIGN PATENT DOCUMENTS

| | | |
|---|---|---|
| GB | 2171880 A | 9/1986 |
| JP | 6290154 A | 10/1994 |
| JP | 2000151682 A | 5/2000 |

OTHER PUBLICATIONS

J. Habetha, "Central Controller Handover Procedure for ETSI-Bran HIPERLAN/2 AD HOC Networks and Clustering With Quality of Service Guarantees", 1st IEEE Annual Workshop on Mobile AD HOC Networking & Computing, Aug. 11, 2000.

Li Jiandong et al, User-Dependent Perfect-Scheduling Multiple Access (UPMA) for Wireless AD HOC Internet Acess, Proceedings of 16th International Proceedings of 16th International Conference on Communication Technology, vol. 2, Aug. 21-25, 2000, pp. 1714-1717.

Jorg Peetz, "HIPERLAN/2 Multihop AD HOC Communication by Multiple-Frequency Forwarding" Vehicular Technology Conference, vol. 3 of 4, Conf. 42, May 6, 2001, pp. 2118-2122.

J. Habetha et al, "Concept of a Centralized Multihop AD HOC Network", Proceedings Eurpoean Wireless, Dresden, Sep. 2000.

* cited by examiner

NETWORK WITH SEVERAL SUBNETWORKS

The invention relates to a network with several subnetworks, each connectable by bridge terminals.

The subnetworks may operate at different frequencies or codes or at different times. Within each individual network, terminals communicate in a wireless manner over one or more radio sections. Furthermore, a central monitoring station may or may not be present within a subnetwork.

Such a network is known for example from "Habetha, J.; Nadler, M.: Concept of a Centralised Multihop Ad Hoc Network; Proceedings European Wireless, Dresden, September 2000". In this known network, adjoining subnetworks operate at different frequencies and are linked together by bridge terminals that are in the overlap range of two subnetworks. The bridge terminals take part alternately in the operation within the two subnetworks, by switching back and forth from one frequency to the other. There is the possibility in each of the subnetworks of suppressing any transmission to the bridge terminal while it is operating at the frequency of another subnetwork. This is managed by a central monitoring station in each of the subnetworks, which is responsible for the assignment of transmission resources within the subnetwork and is informed about the absence of the bridge terminal. During the absence of the bridge terminal, the central monitoring station thus allocates no transmission capacity to any other stations which have applied for a transmission directed at the bridge terminal.

It is an object of the invention to provide a network with improved communication possibilities between the subnetworks. The object is reached according to the invention with a network with several networks, each connectable by bridge terminals, wherein it is provided that in at least one of the subnetworks a proxy terminal for a bridge terminal is set up, which during an absence of the bridge terminal accepts data directed to the bridge terminal or to be forwarded by the bridge terminal, temporarily stores the data, and forwards said data to the bridge terminal when this is present again.

According to the invention, a bridge terminal therefore chooses a different station as its proxy, which accepts and temporarily stores all data directed at the bridge terminal during the absence of the bridge terminal. When the bridge terminal switches back to the frequency (the code or time range) of the subnetwork under consideration, the proxy then passes to the bridge terminal all the data accepted on its behalf in the preceding period.

The present invention relates advantageously to a network in which in at least one subnetwork either no central monitoring station exists or for some other reason a transmission to the bridge terminal cannot be suppressed during its absence.

The object is also reached according to the invention with a bridge terminal according to claim 5 and a proxy terminal according to claim 6.

The networks may be organized either decentrally or centrally.

The absence may be dictated by frequency, time, code or other factors.

If a central monitoring station exists in a subnetwork, but a transmission to the bridge terminal is not possible during its absence, the central monitoring station is chosen by the bridge terminal as its proxy, according to a preferred embodiment of the invention.

Figure 2:
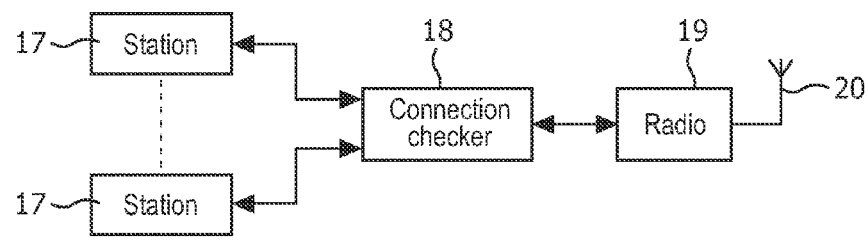
Figure 3:
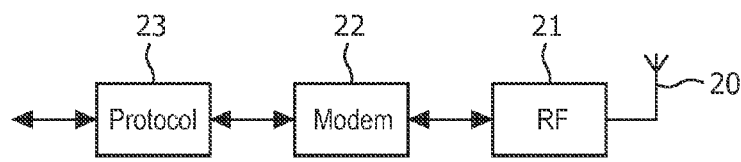
Figure 4:
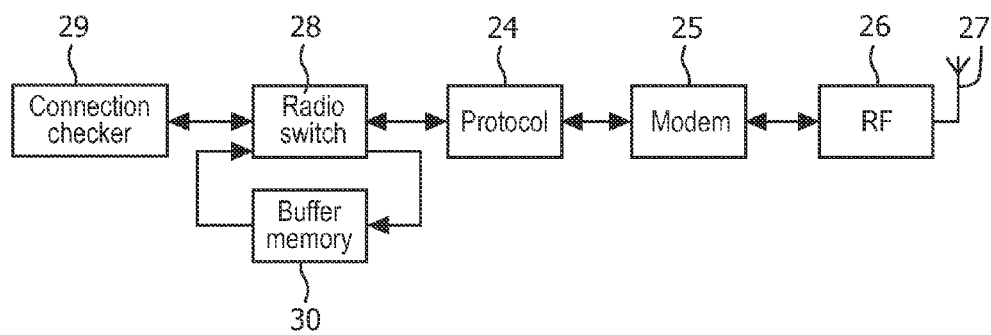

The invention will be described in more detail below with reference to embodiments shown in the drawings, in which:

FIG. 1 shows an ad hoc network with three subnetworks, each containing terminals provided for radio transmission, FIG. 2 shows a terminal of the local network as in FIG. 1, FIG. 3 shows a radio device of the terminal as in FIG. 2, and FIG. 4 shows an implementation of a bridge terminal provided for connecting two subnetworks, and the proxy terminal of this bridge terminal.

The embodiment presented in the following relates to ad hoc networks, which in contrast to traditional networks are self-organizing. Every terminal in such an ad hoc network can enable access to a fixed network and can be used immediately. An ad hoc network is characterized in that the structure and the number of participants are not fixed within predefined limiting values. For example, a communication device of a participant can be taken out of the network or linked in. In contrast to traditional mobile telecommunication networks, an ad hoc network is not dependent on a permanently installed infrastructure.

The size of the ad hoc network's area is generally very much greater than the transmission range of a terminal. A communication between two terminals can therefore necessitate the activation of further terminals, so that these can transfer messages or data between the two communicating terminals. Such ad hoc networks, in which forwarding of messages and data via a terminal is necessary, are referred to as multihop ad hoc networks. Multihop ad hoc networks can either be operated at a frequency (or a code or time range), or consist of sub-networks that each operate at a different frequency, code or time rang. A subnetwork of the ad hoc network may be formed, for example, by terminals, connected over radio links, of participants sitting round a table. Such terminals may be, for example, communication devices for wireless exchange of documents, images, etc.

Two types of ad hoc networks can be specified. These are decentralized and centralized ad hoc networks. In a decentralized ad hoc network, the communication between the terminals is decentralized, i.e. each terminal can communicate directly with any other, provided that the terminal is within the other terminal's transmission range in each case. The advantage of a decentralized ad hoc network is its simplicity and robustness against errors. In a centralized ad hoc network certain functions, such as the function of multiple access of a terminal to the radio transmission medium (Medium Access Control=MAC), are controlled by one particular terminal per subnetwork. This terminal is referred to as the central terminal or central controller (Central Controller=CC). These functions need not always be executed by the same terminal: they can be transferred from one terminal serving as the central controller to another terminal then acting as central controller. The advantage of a central ad hoc network is that an agreement on the quality of service (QoS) is easily possible in it. One example of a centralized ad hoc network is a network that is organized according to the HIPERLAN/2 Home Environment Extension (HEE) (see J. Habetha, A.Hettich, J. Peetz, Y. Du, "Central Controller Handover Procedure for ETSI-BRAN HIPERLAN/2 Ad Hoc Networks and Clustering with Quality of Service Guarantees", 1$^{st}$ IEEE Annual Workshop on Mobile Ad Hoc Networking & Computing, Aug. 11, 2000).

FIG. 1 shows an embodiment of an ad hoc network with three subnetworks 1 to 3, which each contain several terminals 4 to 16. Constituents of the subnetwork 1 are the terminals 4 to 9, of the subnetwork 2 the terminals 4 and 10 to 12, and of subnetwork 3 the terminals 5 and 13 to 16. In a subnetwork, the terminals belonging to that subnetwork exchange data over radio links. The ellipses drawn in FIG. 1 specify the radio coverage area of a subnetwork (1 to 3), in which a largely problem-free radio transmission is possible between the terminals belonging to the subnetwork.

The terminals 4 and 5 are called bridge terminals, because these enable data exchange between two subnetworks 1 and 2 or 1 and 3 respectively. The bridge terminal 4 is responsible for the data traffic between the subnetworks 1 and 2, and the bridge terminal 5 for the data traffic between the subnetworks 1 and 3.

A terminal 4 to 16 of the local network according to FIG. 1 can be a mobile or a fixed communication device and contains, for example, at least one station 17, a connection-checking device 18, and a radio device 19 with an antenna 20, as shown in FIG. 2. A station 17 may be, for example, a portable computer, telephone, etc.

As is shown in FIG. 3, a radio device 19 of the terminals 6 to 16 comprises besides the antenna 20 a radio-frequency circuit 21, a modem 22, and a protocol device 23. The protocol device 23 forms packet units from the data stream received from the connection-checking device 18. A packet unit contains part of the data stream and additional control information formed by the protocol device 23. The protocol device uses protocols for the LLC layer (LLC=Logical Link Control) and the MAC layer (MAC=Medium Access Control). The MAC layer controls the multiple access of a terminal to the radio transmission medium, and the LLC layer performs a flow and error control.

As was mentioned above, a specific terminal may be responsible for the monitoring and management functions in a subnetwork 1 to 3 of a centralized ad hoc network, and in this case is referred to as a central controller. The controller also works as a normal terminal in the associated subnetwork. The controller is responsible, for example, for the registration of terminals that start operations in the subnetwork, for the connection setup between at least two terminals in the radio transmission medium, for the resource management, and for the access control in the radio transmission medium. Thus, for example, after registering and after signaling a desire to transmit, a terminal in a subnetwork is allocated transmission capacity for data (packet units) by the controller.

In the ad hoc network, the data may be exchanged between the terminals by a TDMA, FDMA, CDMA, or CSMA method (TDMA=Time Division Multiplex Access, FDMA=Frequency Division Multiplex Access, CDMA=Code Division Multiplex Access, CSMA=Carrier Sense Multiple Access). The methods may also be combined. Each subnetwork 1 to 3 of the local network is assigned a number of specific channels, referred to as channel groups. A channel is defined by a frequency range, a time range or, for example with the CDMA method, by a spreading code. For example, a specific frequency range, different in each case, with a carrier frequency $f_1$ may be available to each subnetwork 1 to 3 for data exchange. In such a frequency range, data can be transferred by TDMA or CSMA, for example. The carrier frequency $f_1$, may be allocated to the subnetwork 1, the carrier frequency $f_2$ to the subnetwork 2 and the carrier frequency $f_3$ to the subnetwork 3. The bridge terminal 4 operates on the one hand at the carrier frequency $f_1$ in order to be able to execute a data exchange with the other terminals of subnetwork 1, and on the other hand at the carrier frequency $f_2$ in order to be able to execute a data exchange with the other terminals of subnetwork 2. The second bridge terminal 5 included in the local network, which transfers data between the subnetworks 1 and 3, operates at the carrier frequencies $f_1$, and $f_3$.

FIG. 4 is a block diagram of an embodiment of a bridge terminal. The construction of the proxy terminal may also be executed in the same way. The radio switching device for this bridge terminal comprises a protocol device 24, a modem 25 and a radio-frequency circuit 26 with antenna 27. The protocol device 24 is connected to a radio switching device 28, which is further connected to a connection-checking device 29 and a buffer memory device 30. The buffer memory device 30 in this embodiment comprises a storage element, is used for temporary storage of data, and is implemented as a FIFO module (First In First Out), i.e. the data is read from the buffer memory device 30 in the order in which it was written into it. The existence of a buffer memory facility for the proxy terminal is of special significance, since this temporarily stores all data directed to the bridge terminal during its absence. The memory can be divided into logic areas for separate storage of the data from different connections. The terminal shown in FIG. 4 can likewise work as a normal terminal. Stations connected to the connection-checking device 29, which are not drawn in FIG. 4, then deliver data via the connection-checking device 29 to the radio switching device 28.

The bridge terminal of FIG. 4 is synchronized alternately with a first and a second subnetwork. Synchronization is understood to be the entire process of integrating a terminal up to the exchange of data. If the bridge terminal is synchronized with the first subnetwork, it can exchange data with the terminals adjacent to it in radio range, and with a controller (if present) of this first subnetwork. If data is delivered from the connection-checking device 29 to the radio switching device 28, its destination being a terminal or the controller of the first subnetwork or a terminal or controller of another subnetwork which can be reached via the first subnetwork, the radio switching device forwards this data directly to the protocol device 24. The data is temporarily stored in the protocol device 24 until the time slot determined by the controller for the transmission is reached. If the data output from the connection-checking device 29 is to be sent to a terminal or the controller of the second subnetwork or to another subnetwork accessible via the second subnetwork, the radio transmission must be delayed until the time slot in which the bridge terminal is synchronized with the second subnetwork. The radio switching device therefore routes the data whose destination is in the second subnetwork or accessible via the second subnetwork, to the buffer memory device 30, which temporarily stores the data until the bridge terminal is synchronized with the second subnetwork.

If data from a terminal or the controller of the first subnetwork is received by the bridge terminal, its destination being a terminal or the controller of the second subnetwork or a terminal or controller of another subnetwork accessible via the second subnetwork, this data is likewise stored in the buffer memory device 30 up to the synchronization with the second subnetwork. Data whose destination is a station of the bridge terminal is passed directly via the radio switching device 28 to the connection-checking device 29, which then routes the received data to the desired station. Data whose destination is neither a station of the bridge terminal nor a terminal or controller of the second subnetwork is sent, for example, to a further bridge terminal.

After the change of synchronization of the bridge terminal from the first to the second subnetwork, the data stored in the buffer memory device 30 is read back from the buffer memory device 30 in the order in which it was written. Then, during the period of time that the bridge terminal is synchronized with the second subnetwork, all data whose destination is a terminal or the controller of the second subnetwork, or another subnetwork accessible via the second subnetwork, can be passed on at once from the radio switching device 28 to the protocol device 24, and only the data whose destination is a terminal or the controller of the first subnetwork, or another subnetwork accessible via the first subnetwork, is stored in the buffer memory device 30.

The proxy terminal is constructed similarly to the bridge terminal, but does not perform a frequency change. It is informed about its proxy role in a once-only or periodic explicit signal from the bridge terminal. The proxy terminal can refuse this role. If it accepts the proxy role, the bridge terminal informs the proxy terminal about the starting time and duration of its absence (or once only about the periods of its presences and absences).

If during the absence of the bridge terminal data is received from a terminal or a controller of the first subnetwork, its destination being the bridge terminal or a terminal or controller of the second subnetwork accessible via the bridge terminal, this data is stored in the buffer memory device 30 of the proxy terminal until the return of the bridge terminal to the first subnetwork. Data whose destination is a station of the proxy terminal itself is passed directly via the radio switching device 28 to the connection-checking device 29, which then routes the received data to the desired station.

After the return of the bridge terminal, the data stored in the buffer memory device 30 of the proxy terminal is read back from the buffer memory device 30 in the order in which it was written and sent to the bridge terminal. The proxy terminal may either be informed explicitly by a signal from the bridge terminal about its return, or it may infer the return time implicitly from the periods of the presence and absence times for the bridge terminal. Afterwards, during the period of time that the bridge terminal is synchronized with the first subnetwork, all data whose destination is a terminal or a controller of the second subnetwork, or another subnetwork accessible via the second subnetwork, can be accepted by the bridge terminal itself.

As an example of a possible embodiment for two adjoining subnetworks, one of the subnetworks could work in accordance with the IEEE Standard 802.11, while the second subnetwork to be connected would operate in accordance with the ETSI Standard HIPERLAN/2. This would presuppose that the bridge terminal was able to communicate in accordance with both standards. In this case a proxy terminal only has to be set up in the first (CSMA-based) subnetwork, which is working in accordance with the IEEE 802.11. In the second HIPERLAN/2 subnetwork, the so-called central controller could suppress all transfers to the bridge terminal during its absence. As was noted for the general case, according to the invention, the central monitoring station of the 802.11 network, called the "Point Coordinator (PC)" or "Hybrid Coordinator (HC)", should (if active) be selected as the proxy terminal in the 802.11 based subnetwork. If no PC/HC is active in the first subnetwork, the bridge terminal may choose any terminal in this network as the proxy terminal. For example, in this case the best receivable adjoining terminal of this network could be selected as proxy terminal. The invention is thus suitable for connecting together networks operating in accordance with different standards.

Another embodiment of the invention could, for example, involve the linking together of two or more subnetworks of the same standard. If two adjoining subnetworks operate work in accordance with the IEEE 802.11 Standard at different frequencies, for example, at least one bridge terminal and a proxy terminal should be set up in each of the two subnetworks.

Finally, a further possible arrangement of the proxy concept should be described in which at least two or more bridge terminals are set up between the same subnetworks. If the bridge terminals coordinate their presence in the adjoining subnetworks in such a way that always at least one bridge terminal is present (this is suggested, for example, in "Peetz, J.: HiperLAN2 Multihop Ad Hoc Communication by Multiple-Frequency Forwarding, Vehicular Technology Conference, Rhodes, May 2001"), the bridge terminal present any given time the time could act as the proxy terminal for the other bridge terminals set up between the same subnetworks.

The invention claimed is:

1. A network comprising:

several subnetworks, each connectable by bridge terminals and including at least one other terminal, wherein at least one of said at least one other terminal provided in at least one of the subnetworks is set up as a proxy terminal during a planned absence of one of said at least one of the bridge terminals from said one of the subnetworks, wherein the proxy terminal accepts designation as a proxy server by said absent bridge terminal;

accepts data directed to said absent bridge terminal or to be forwarded by said absent bridge terminal to said one of the subnetworks, temporarily stores the data, and forwards said data to said absent bridge terminal when said absent bridge terminal is present again in said one of the subnetworks, wherein said planned absence of said one of said at least one bridge terminals from said one of the subnetworks is for a predetermined time; wherein one or more of the subnetworks includes a central monitoring station, wherein for each subnetwork having a central monitoring station, the central monitoring station is selected as the proxy terminal for said bridge terminal during the planned absence of said bridge terminal.

2. The network of claim 1, wherein at least two subnetworks operate in accordance with different communication standards, and the bridge terminals operate in accordance with both communication standards for data exchange of those subnetworks that operate in accordance with different communication standards.

3. The network of claim 1, wherein a plurality of bridge terminals connect a same two of the subnetworks and wherein during the absence of one of the plurality of bridge terminals, another one of the plurality of bridge terminals is selected as the proxy terminal.

4. The network of claim 1, wherein at least two of the subnetworks connectable by the bridges are wireless subnetworks each comprising a plurality of terminals that communicate wirelessly with each other.

5. The network of claim 1, wherein at least one subnetwork includes a central controller, and wherein during the absence of the bridge terminal, the central controller suppresses data transfers to the bridge terminal.

6. A bridge terminal for a network comprising at least two subnetworks, each of said two subnetworks having a plurality of terminals, said bridge terminal comprising:

an antenna;

a radio device connected to the antenna;

a protocol device connected to the radio device;

a radio switching device connected to the protocol device;

a buffer memory connected to the radio switching device; and wherein the bridge terminal operates such that when the bridge terminal is unavailable to one of said two subnetworks, the bridge terminal selects one of the terminals in the one of said two subnetworks to be a proxy terminal and the selected terminal operates to:

function as a proxy server selected by the bridge terminal;
receive all data directed to the bridge terminal to be transferred to said one of the two subnetworks,
temporarily store the data, and
forward the data to the bridge terminal when the bridge terminal is again available to the one of the two subnetworks, wherein the unavailability of the bridge terminal from said one of the two subnetworks is planned for a predetermined time, wherein when the bridge terminal is unavailable to one of the two subnetworks, and when the one of the two subnetwork has a central controller, then the bridge terminal selects the central controller to be the proxy server.

7. In a network comprising at least first and second subnetworks each having a plurality of terminals linked by a bridge terminal, a proxy terminal provided in the first subnetwork, the proxy terminal comprising:
an antenna;
a radio device connected to the antenna;
a protocol device connected to the radio device;
a radio switching device connected to the protocol device; and
a buffer memory connected to the radio switching device, wherein the proxy terminal operates such that when the bridge terminal is unavailable to the first subnetwork, the proxy terminal:
accepts designation as a proxy server selected by the bridge terminal;
receives all data directed to the bridge terminal to be transferred to first network,
temporarily stores the data, and
forwards the data to the bridge terminal, when the bridge terminal is again available to the first subnetwork, wherein the unavailability of the bridge terminal from the first network is planned for a predetermined time, wherein the proxy terminal designated as the proxy server is a central controller in the first subnetwork.

* * * * *